(12) United States Patent
Brombolich

(10) Patent No.: US 7,222,057 B2
(45) Date of Patent: May 22, 2007

(54) TOPOLOGY MODELER

(75) Inventor: Daniel L. Brombolich, Saint Charles, MO (US)

(73) Assignee: UGS Corp., Plano, TX (US)

( * ) Notice: Subject to any disclaimer, the term of this patent is extended or adjusted under 35 U.S.C. 154(b) by 931 days.

(21) Appl. No.: 10/160,424

(22) Filed: May 31, 2002

(65) Prior Publication Data
US 2003/0225553 A1 Dec. 4, 2003

(51) Int. Cl.
*G06F 7/60* (2006.01)
*G06F 17/10* (2006.01)

(52) U.S. Cl. .......................................... 703/2
(58) Field of Classification Search ............ 703/2; 716/20
See application file for complete search history.

(56) References Cited

U.S. PATENT DOCUMENTS

| | | | |
|---|---|---|---|
| 5,390,127 A | 2/1995 | Tang et al. ................. 700/146 |
| 5,891,131 A * | 4/1999 | Rajan et al. ................... 606/5 |
| 6,064,810 A * | 5/2000 | Raad et al. ................... 703/23 |
| 6,198,486 B1 * | 3/2001 | Junkins et al. ............. 345/419 |
| 6,212,486 B1 | 4/2001 | Huang et al. .................. 703/7 |
| 6,263,252 B1 | 7/2001 | St. Ville ....................... 700/98 |
| 6,317,704 B1 * | 11/2001 | Furuhata et al. ............... 703/2 |
| 6,369,815 B1 | 4/2002 | Celniker et al. ............ 345/420 |
| 6,392,647 B1 * | 5/2002 | Migdal et al. .............. 345/423 |
| 6,426,750 B1 * | 7/2002 | Hoppe ........................ 345/428 |
| 6,489,960 B2 * | 12/2002 | DeRose et al. ............. 345/423 |
| 6,611,267 B2 * | 8/2003 | Migdal et al. .............. 345/428 |
| 6,625,938 B1 * | 9/2003 | Shimada et al. ............. 52/81.1 |
| 6,714,901 B1 | 3/2004 | Cotin et al. .................... 703/7 |
| 6,718,291 B1 * | 4/2004 | Shapiro et al. ................. 703/2 |
| 6,947,879 B2 * | 9/2005 | Yamada et al. ................ 703/2 |
| 2002/0035453 A1 * | 3/2002 | Pond et al. ..................... 703/2 |
| 2002/0072883 A1 * | 6/2002 | Lim et al. ...................... 703/2 |
| 2003/0080957 A1 * | 5/2003 | Stewart et al. .............. 345/420 |
| 2005/0055183 A1 * | 3/2005 | Tani et al. ..................... 703/2 |

OTHER PUBLICATIONS

Alan H. Barr, "*Global and Local Deformations of Solid Primitives*", Computer Graphics, New York, N.Y., US, XP-002267388, vol. 18 (pp. 21-30), Jul. 1984.

Paul Borrel, "*Simple Constrained Deformations for Geometric Modeling and Interactive Design*", ACM Transactions on Graphics, Association for Computing Machinery, New York, US, XP 000461728, vol. 13, No. 2 (pp. 137-155), Apr. 1, 1994.

Andrew Witkin and William Welch, *Fast Anmiation and Control of Nonrigid Structures*, Computer Graphics, XP-002279233, vol. 24, No. 4 (pp. 243-252), Aug. 1990.

(Continued)

*Primary Examiner*—Paul Rodriguez
*Assistant Examiner*—Andre Pierre-Louis
(74) *Attorney, Agent, or Firm*—Baker Botts, LLP

(57) ABSTRACT

According to one embodiment of the invention, a method for modeling a feature associated with a deformed material is provided. The method includes generating a first mesh having a model of a feature and a second mesh. A normal distance between a point on the model of the feature and the surface of the first mesh is measured. A location of the surface point of the first mesh that is used to measure the normal distance is determined. The determined location is used to locate the same surface point on the second mesh. A new location for a new point corresponding to the point on the model of the feature associated with the first mesh is determined. The new location is located at the distance as the determined normal distance, but along a normal vector that intersects the same surface point on the second mesh.

20 Claims, 3 Drawing Sheets

OTHER PUBLICATIONS

PCT Notification of Transmittal of The International Search Report or the Declaration dated Jun. 21, 2004 for PCT/US03/17191.
Daniel L. Brombolich, "*Declaration of Daniel L. Brombolich Pursuant to 37 C.F.R. Sec. 1.132*," signed Apr. 12, 2004, (pp. 1-2).
PCT Notification of Transmittal of the International Search Report or the Declaration, mailed Mar. 12, 2004, including International Search Report re PCT/US 03/16489 (7 pgs.).

S.C. Tang and L.B. Chappuis, "Evaluation of Sheet Metal Forming Process Design by Simple Models", ASME Mater Div. Publ. MD, American Society of Mechanical Engineers, vol. 8, (19-26 pgs.), 1988.
Notification of Transmittal of International Preliminary Examination Report, PCT, International Application No. PCT/US03/17191, 5 pages, Sep. 20, 2006.

* cited by examiner

TOPOLOGY MODELER

TECHNICAL FIELD OF THE INVENTION

This invention relates generally to computer-aided modeling and more particularly to a topology modeler.

BACKGROUND OF THE INVENTION

Mechanical devices having associated features are frequently designed using Finite Element Analysis ("FEA") software applications. For example, a hood of an automobile formed from a piece of sheet metal may be modeled by a FEA software application. To model the forming of a material into a particular shape, the FEA application may generate a mesh that models the material in its initial state. Then the FEA application incrementally determines the displacement of each element of the mesh based on certain boundary conditions until a resulting mesh models the desired shape of the material.

A feature associated with the device, such as an air intake vent positioned over the hood, may be modeled by incorporating the shape of the feature into the FEA process. Because modeling a feature as a part of the mesh requires a more complex mesh having more elements, such a modeling adds complexity to the FEA process.

SUMMARY OF THE INVENTION

According to one embodiment of the invention, a method for modeling a feature associated with a deformed material is provided. The method includes generating a first mesh model modeling a material in a pre-deformation configuration. The method also includes defining a model of the feature with respect to the first mesh model. The model comprises a plurality of points. The method also includes generating, by performing a finite element analysis, a second mesh model modeling the material in a deformed configuration. The method also includes modeling the response of the feature to the deformation of the material modeled by the second mesh model. The act of modeling the response includes measuring a distance between at least one of the plurality of points and a surface point of the first mesh model along a vector that is normal to the surface of the first mesh model. The vector that is normal to the surface of the first mesh model also intersects the at least one of the plurality of points and the surface point. The act of modeling the response also includes determining the location of the surface point. The act of modeling the response also includes locating the same surface point on the second mesh model as the surface point on the first mesh model. The act of modeling the response also includes determining a new location for a new point corresponding to the at least one of the plurality of points. The new location located at the measured distance away from the same surface point of the second mesh model along a vector that is normal to the second mesh model. The vector that is normal to the second mesh model intersects the same surface point on the second mesh model.

Some embodiments of the invention provide numerous technical advantages. Some embodiments may benefit from some, none, or all of these advantages. For example, according to one embodiment, a model of the feature with respect to the deformed material may be generated without complicating the FEA process, which reduces the required computing power and time for performing the FEA. According to another embodiment, a user may select other features having different shapes to place on the deformed material without using the FEA process.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS OF THE INVENTION

Embodiments of the invention are best understood by referring to FIGS. 1A through 3C of the drawings, like numerals being used for like and corresponding parts of the various drawings.

Figure 1A:
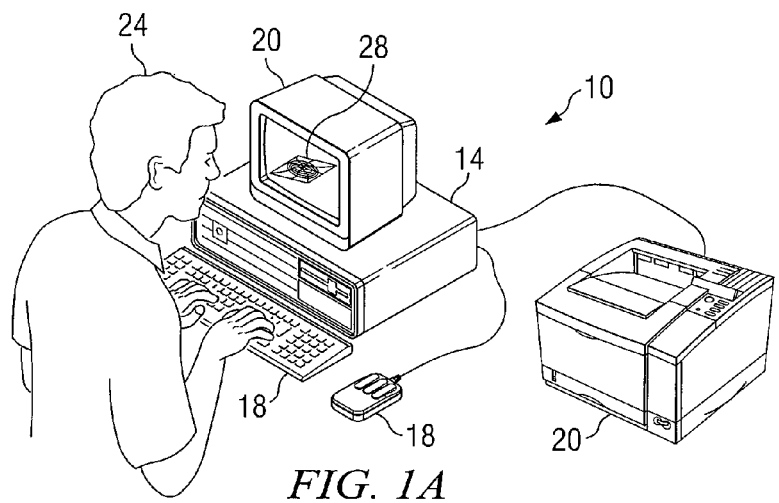
FIG. 1A is a schematic diagram illustrating an embodiment of a computer system operable to perform a method of finite element analysis according to one embodiment of the present invention.

FIG. 1A is a schematic diagram illustrating an embodiment of a computer system 10 for performing finite element analysis ("FEA") that may benefit from the teachings of the present invention. System 10 includes a computer 14 that is coupled to one or more input devices 18 and one or more output devices 20. A user 24 has access to system 10 and may utilize input devices 18 to input data and generate and edit a drawing 28 that may be displayed by any or all of output devices 20.

As shown in FIG. 1A, examples of input device 18 are a keyboard and a mouse; however, input device 18 may take other forms, including a stylus, a scanner, or any combination thereof. Examples of output devices 20 are a monitor of any type and a printer; however, output device 16 may take other forms, including a plotter. Any suitable visual display unit, such as a liquid crystal display ("LCD") or cathode ray tube ("CRT") display, that allows user 24 to view drawing 28, may be a suitable output device 20.

Figure 1B:
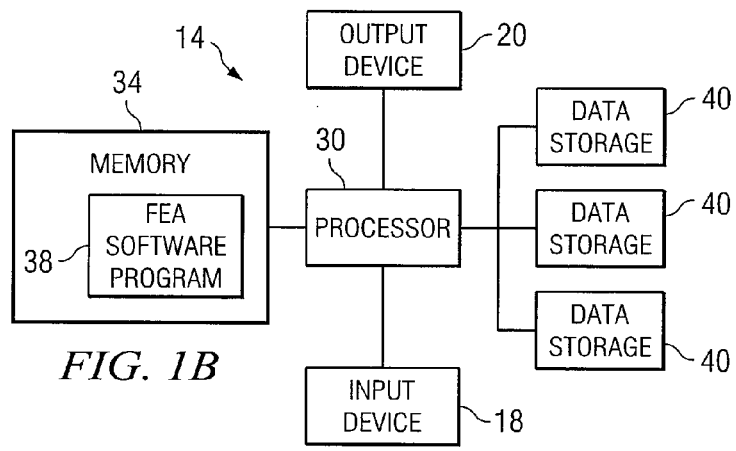
FIG. 1B is a block diagram illustrating an embodiment of a computer shown in FIG. 1A.

FIG. 1B is a block diagram of computer 14 for use in performing FEA according to one embodiment of the present invention. As illustrated, computer 14 includes a processor 30 and a memory 34 storing a FEA software program 38. Computer 14 also includes one or more data storage units 40 for storing data related to FEA software program 38 or other data.

Processor 30 is coupled to memory 34 and data storage unit 40. Processor 30 is operable to execute the logic of FEA software program 38 and access data storage unit 40 to retrieve or store data relating to drawings. Examples of processor 30 are the Pentium™ series processors, available from Intel Corporation.

Memory 34 and data storage unit 40 may comprise files, stacks, databases, or other suitable forms of data. Memory 34 and data storage unit 40 may be random-access memory, read-only memory, CD-ROM, removable memory devices, or any other suitable devices that allow storage and/or retrieval of data. Memory 34 and data storage unit 40 may be interchangeable and may perform the same functions.

FEA software program 38 is a computer program that allows user 18 to model a device through FEA using computer 14. PEA software program 38 may be a part of a drawing application, such as a Computer-Aided Drafting ("CAD") package, or exist as an independent computer application. PEA software program 38 may include a function for modeling the topology of the device. The topology modeling function may exist as a separate application. "Topology" refers to the variation of the shape of a device due to its associated features. A "feature" refers to any structures and voids that are aligned with any portion of the device. A feature may be on or off of the surface of the device. A feature may also be inside of the device. In some instances, FEA software program may by operable to model the topology of the device as well as the device itself through the process of FEA. However, the topology function may be served by a separate application that is bundled with FEA software program 38.

FEA software program 38 may reside in any storage medium, such as memory 34 or data storage unit 40. FEA software program 38 may be written in any suitable computer language, including C or C++. FEA software program 38 is operable to allow user 18 to input boundary conditions, such as an initial position of a curve and a final position of a curve, so that a resulting predicted shape may be displayed on output device 20 and/or stored in data storage unit 40. An example FEA software program 38 that may incorporate the teachings of the invention is Region Analyzer™, available from Unigraphics Solutions, Inc.

Figure 2A:
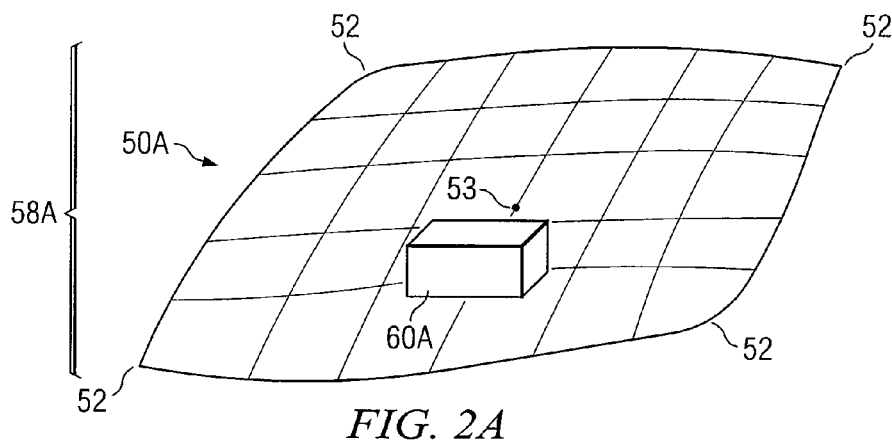
FIG. 2A is a schematic diagram illustrating an embodiment of a model of a feature on a mesh that may be used in a method of finite element analysis.
Figure 2B:
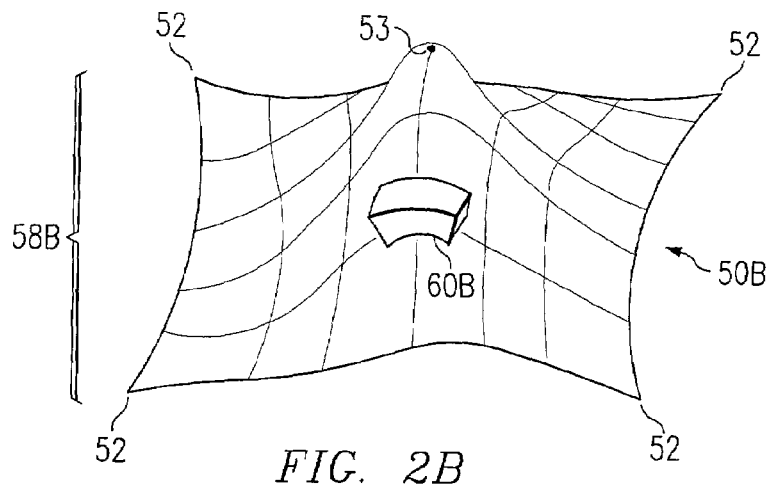
FIG. 2B is a schematic diagram illustrating an embodiment of a model of a feature on a mesh resulting from performing the method of finite element analysis.

FIGS. 2A and 2B graphically illustrate the forming of a material used to form a device that has an associated feature. An example of a forming process includes stamping a hood of an automobile out of a material such as sheet metal. The hood of the automobile may have an associated feature overlying the hood, such as an air intake that increases the flow of air into the combustion chamber of the engine. However, a feature may have other shapes and sizes.

A mesh 50A shown in FIG. 2A is an embodiment of a model of the material prior to the forming operation. A model 60A is a model of a feature that is on the material prior to the forming operation. Mesh 50A comprises a plurality of elements 58A. Element 58A may have a simply shaped geometry, such as a triangle, quadrilateral, or other polygons. Although only quadrilaterals are shown in mesh 50A of FIG. 2A, any polygon or a combination of polygons may be used to form mesh 50A to model a particular geometry of the material. In the embodiment shown in FIG. 2A, mesh 50A has four corners 52 and a center 53; however, depending on the geometry of a mesh, there may be more or less corners 52. One or more boundary conditions may be imposed on mesh 50A to appropriately displace portions of mesh 50A so that mesh 50A models the displacement of the material. Mesh 50A may be generated by a FEA software program or an associated mesh generator (not explicitly shown). Model 60A may be generated by the FEA software program or any other application operable to generate a model of a feature, such as model 60A.

Referring to FIG. 2B, mesh 50B illustrates the shape that results from enforcing a set of boundary conditions that operate to fix four corners 52 of mesh 50A and displacing center 53 of mesh 50A in an upward direction. Mesh 50B may be generated by a FEA software program or an associated mesh generator (not explicitly shown). Although only center 53 is displaced upwards, that displacement results in the displacement of the surface of the material that surrounds center 53 as well as the edges of the material. Thus, elements 58A, which initially represented the areas that surround center 53, are also individually displaced. The displaced elements 58A are illustrated as elements 58B on mesh 50B, where each element 58B corresponds to a particular element 58A. These displacements are reactions to the movement of center 53 while fixing corners 52. Although elements 58A and 58B are depicted as separate elements, each of elements 58A and its corresponding one of elements 58B represents the same corresponding portion of the feature.

Different materials may experience different type and level of displacements. For example, rubber may experience a more drastic displacement in its edges and the surrounding areas of a particular region that is moved because rubber has a higher degree of elasticity. Furthermore, different boundary conditions may be imposed so that different restrictions and movements may be imposed on mesh 50A. Applying a different set of boundary conditions would result in a final mesh having a different shape than that of mesh 50B shown in FIG. 2B.

Because the material has been displaced, as shown by mesh 50B, the feature is also displaced in response to the displacement of mesh 50B. The displaced feature is modeled by a model 60B. Model 60B may be generated by the FEA software program or any other application operable to generate a model of a feature, such as model 60B.

To model the resulting shape of the feature after the forming of the material, a conventional modeling method may model the feature as a part of the FEA process. Such a modeling process complicates an already complicated FEA process that requires repeated calculations of a myriad of equations. Thus, the required computing power and time increases. Additionally, modeling a feature as a part of a FEA process limits a user's ability to select other features having different shapes to place on the deformed material because the entire process of FEA may have to be repeated for each selection.

According to some embodiments of the present invention, a method, an apparatus, and a system are provided for modeling a feature by using the respective normal distances between the points of the feature and the initial mesh to model the feature relative to the final mesh. This is advantageous because a feature may be modeled relative to the formed material without increasing the computing power and time that may be required to perform a more complicated FEA. In some embodiments of the invention, a user may select other features having different shapes to place on the deformed material without using the FEA process. Additional details of example embodiments of the system and method are described in greater detail below in conjunction with FIGS. 3A through 3C.

Figure 3A:
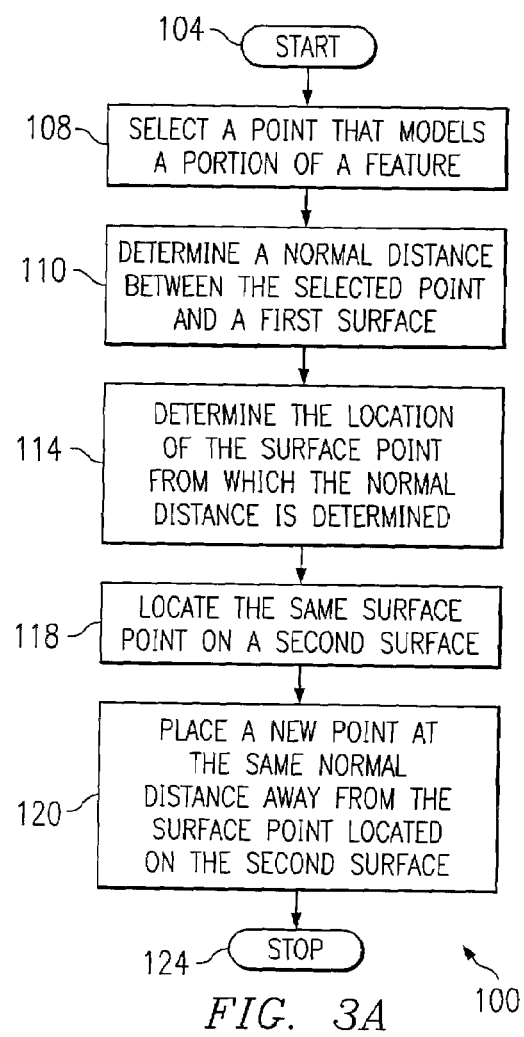
FIG. 3A is a flowchart illustrating an embodiment of a method of modeling a feature with respect to the mesh modeling a deformed material, as shown in FIG. 2B.
Figure 3B:
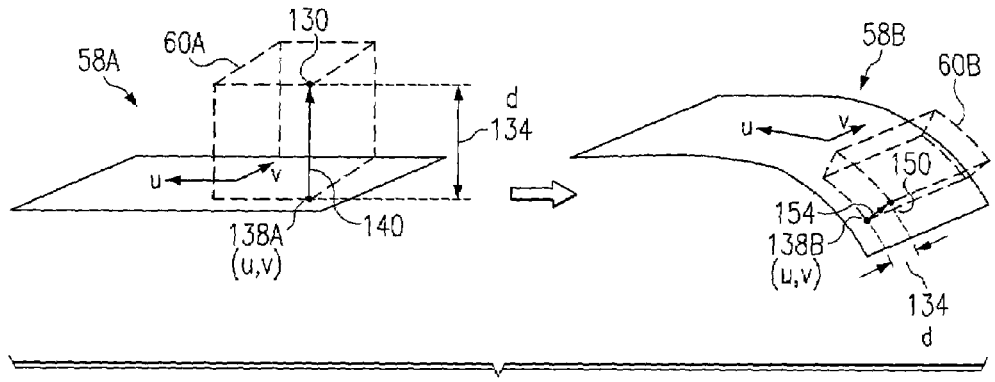
FIG. 3B is a schematic diagram graphically illustrating an embodiment of the method of FIG. 3A.

FIG. 3A is a flowchart illustrating one embodiment of a method 100 of modeling the shape of a feature with respect to a mesh model. An embodiment of method 100 is described in conjunction with FIG. 3B, which is a schematic diagram graphically illustrating an embodiment of method 100. Method 100 starts at step 104. At step 108, a point 130 that models a portion of the feature is selected. In one embodiment, point 130 may represent a point that is positioned on a perimeter of the feature. However, any point that represents the shape of the feature prior to the displacement of the material may be selected. At step 110, a normal distance 134 between selected point 130 and the surface of element 58A is determined. A "normal distance" between a point and a surface refers to the distance between the point along the normal vector of a surface that intersects the point and a point on the surface. In the embodiment shown in FIG. 3B, a normal vector 140 intersects with selected point 130. Normal vector 140 is normal to element 58A at a surface point 138A that is located on element 58A. Thus, normal distance 134, referred to by letter "d" in FIG. 3B, is the distance between selected point 130 and surface point 138A along normal vector 140. At step 114, the location of surface point 138A on element 58A is determined. In one embodiment, a Bezier Patch may be applied on element 58A as a system of determining the relative location of surface point 138A; additional details of the Bezier Patch is provided below in conjunction with FIG. 3C.

At step 118, a surface point 138B on the deformed element 58B having the same relative location, relative to the deformed element 58B, as the determined location of step 114 is located. Although FIG. 3B illustrates surface points 138A and 138B as separate points, surface points 138A and 138B represent a same, single point of a feature. As such, surface points 138A and 138B are the same surface point. Illustrating the same, single point as point 138A and 138B depicts the global displacement of element 58A and points of the element 58A due to the displacement of an entire mesh. Because surface points 138A and 138B represent the same, single point, the relative location, with regard to elements 58A and 58B, of the point within element 58A and corresponding element 58B stays the same.

At step 120, a new point 150 is positioned along a normal vector 154 that intersects with surface point 138B and away from surface point 138B by the same determined normal distance 134. Normal vector 154 is normal to the surface of element 58B and intersects with both points 138B and 150. Method 100 stops at step 124.

Modeling the features by offsetting a point by a normal distance determined from a previous model of the feature is advantageous because a model of the feature with respect to the deformed material may be generated without complicating the FEA process. This reduces the required computing power and time for performing the FEA. Additionally, in some embodiments, other features having different shapes may be modeled according to the deformed material without running the entire FEA for each selected feature shape. The FEA process does not have to be rerun because the feature modeling process is not tied into the FEA process.

In some embodiments, steps 108 through 120 may be repeated until the displaced shape of the entire feature is adequately modeled, as determined by one skilled in the art. For example, in modeling a curve of a feature, a set of points that outlines the curve may be determined. Then, for each point of the set, steps 108 through 120 may be performed. In another example, in modeling a surface of a feature, a set of curves may be sampled from the surface. Then, for each curve, a set of points that outlines the curve may be determined. Then, for each point of the set, steps 108 through 120 may be performed.

Figure 3C:
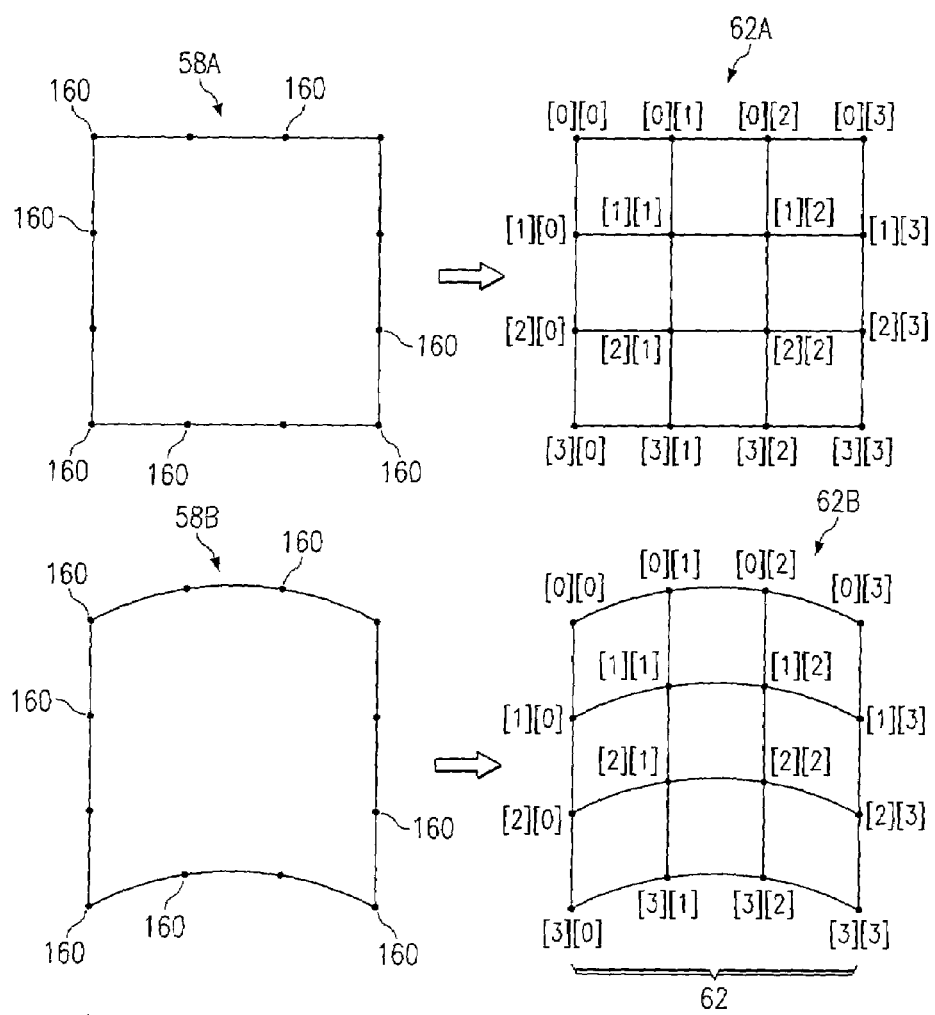
FIG. 3C is a schematic diagram illustrating an embodiment of a system for locating a surface point shown in FIG. 3B.

FIG. 3C is a schematic diagram illustrating one embodiment of a point location system 62. An element of a mesh may have a set of nodes 160. Each node 160 is used to as a reference point for displacement of an element modeled by the FEA process. In one embodiment, element 58A has twelve nodes 160. However, more or less nodes 160 may be designated for each element 58A of mesh 50A. Using these nodes 160, a Bezier Patch, such as a patch 62A, may be applied to element 58A. A "Bezier Patch" refers to a grid system that uses the designated nodes 160 as location references, where the position of any point on an element, such as surface points 138A and 138B, may be expressed relative to nodes 160. For example, the lower left corner node 160 of element 58A has a location value of [3] [0], as shown on patch 62A. A location that is half way between location value [3] [0] and location value [3] [1] (which is the location that is depicted immediately to the right of location [3] [0]) has a location value of [3] [½].

When element 58A is converted to element 58B by displacement, patch 62A also displaces analogously, as shown by a patch 62B. However, the location value of a particular position on either elements 58A or 58B does not change. For example, the lower left node 160 of element 58B still has the location value of [3] [0].

Referring again to FIGS. 3A and 3B, in one embodiment, steps 114 and 118 of method 100 may be performed by using a relative location system, such as patch 62. For example, at step 114, point 138A may be assigned a location value of [2] [1] according to patch 62A of element 58A. Then at step 118, the same point 138B may be located on element 58B by using patch 62B and the location value of [2] [1].

Although the present invention has been described in detail, it should be understood that various changes, substitutions, and alterations can be made hereto without departing from the spirit and scope of the invention as defined by the appended claims.

What is claimed is:

1. A computerized method for modeling a feature associated with a deformed material, comprising:
generating a first mesh model modeling a material in a pre-deformation configuration;
defining a model of the feature with respect to the first mesh model, the model comprising a plurality of points;
generating, by performing a finite element analysis, a second mesh model modeling the material in a deformed configuration;
modeling the response of the feature to the deformation of the material modeled by the second mesh model, the modeling of the response performed by:
measuring a distance between at least one of the plurality of points and a surface point of the first mesh model along a vector normal to the surface of the first mesh model and intersecting the at least one of the plurality of points and the surface point;
determining the location of the surface point;
locating the same surface point on the second mesh model as the surface point on the first mesh model; and
determining a new location for a new point corresponding to the at least one of the plurality of points, the new location located at the measured distance away from the same surface point of the second mesh model along a vector that is normal to the second mesh model, the vector intersecting the same surface point on the second mesh model, the new location representative of the response of the feature to the deformation of the material; and displaying on an output device the feature on the second mesh model modeling in the deformed configuration.

2. The method of claim 1, wherein defining the model of the feature comprises using the plurality of points to define the perimeter of the feature.

3. The method of claim 1, wherein the first mesh model comprises a plurality of elements, each of the plurality of elements comprising a set of nodes, and wherein determining the location of the surface point comprises using the set of nodes in a particular element in which the surface point is positioned as a reference.

4. The method of claim 1, wherein modeling the response of the feature comprises modeling the change in the shape and the dimensions of the feature relative to the deformed configuration of the material.

5. The method of claim 1, wherein modeling the response of the feature comprises automatically modeling the response of the feature upon defining the second mesh model.

6. The method of claim 1, wherein defining a model of the feature comprises defining any curves of the feature with the plurality of points.

7. The method of claim 1, wherein modeling the response of the feature comprises repeating the acts included in the act of modeling the response until each of the plurality of points is assigned one respective new point.

8. The method of claim 1, wherein the surface point of the first mesh model has a relative location value, and wherein locating the same surface point comprises locating a surface point on the second mesh model that has the same relative location value as the surface point of the first mesh model.

9. An apparatus for modeling displacement of a material, comprising:
   a software program stored on a computer readable medium and operable, when executed on a processor, to:
      generate a first mesh model modeling a material in a pre-deformation configuration;
      define a model of the feature with respect to the first mesh model, the model comprising a plurality of points;
      generate, by performing a finite element analysis, a second mesh model modeling the material in a deformed configuration;
      model the response of the feature to the deformation of the material modeled by the second mesh model, wherein the software program is operable to model the response by:
         measuring a distance between at least one of the plurality of points and a surface point of the first mesh model along a vector normal to the surface of the first mesh model and intersecting the at least one of the plurality of points and the surface point;
         determining the location of the surface point;
         locating the same surface point on the second mesh model as the surface point on the first mesh model; and
         determining a new location for a new point corresponding to the at least one of the plurality of points, the new location located at the measured distance away from the same surface point of the second mesh model along a vector that is normal to the second mesh model, the vector intersecting the same surface point on the second mesh model, the new location representative of the response of the feature to the deformation of the material; and
         displaying on an output device the feature on the second mesh model modeling in the deformed configuration.

10. The apparatus of claim 9, wherein the software program is operable to define the model of the feature by using the plurality of points to define the perimeter of the feature.

11. The apparatus of claim 9, wherein the software program is operable to model the response of the feature by modeling the change in the shape and the dimensions of the feature with respect to the deformed configuration of the material.

12. The apparatus of claim 9, wherein the software is operable to model the response of the feature by automatically modeling the response of the feature upon defining the second mesh model.

13. The apparatus of claim 9, wherein the software is operable to define a model of the feature by defining any curves of the feature with the plurality of points.

14. The apparatus of claim 9, wherein the surface point of the first mesh model has a relative location value, and wherein the software program is operable to locate the same surface point by locating a surface point on the second mesh model that has the same relative location value as the surface point of the first mesh model.

15. A system for modeling displacement of a material within a computer-aided analysis environment, comprising:
   a computer system having a display unit, an input device, and a processor;
   a computer readable medium coupled to the computer system, the computer readable medium comprising a software program operable to be executed on the processor and to:
      generate a first mesh model modeling a material in a pre-deformation configuration;
      define a model of the feature with respect to the first mesh model, the model comprising a plurality of points;
      generate, by performing a finite element analysis, a second mesh model modeling the material in a deformed configuration;
      model the response of the feature to the deformation of the material modeled by the second mesh model, wherein the software program is operable to model the response by:
         measuring a distance between at least one of the plurality of points and a surface point of the first mesh model along a vector normal to the surface of the first mesh model and intersecting the at least one of the plurality of points and the surface point;
         determining the location of the surface point;
         locating the same surface point on the second mesh model as the surface point on the first mesh model; and
         determining a new location for a new point corresponding to the at least one of the plurality of points, the new location located at the measured distance away from the same surface point of the second mesh model along a vector that is normal to the second mesh model, the vector intersecting the same surface point on the second mesh model, the new location representative of the response of the feature to the deformation of the material; and
         displaying on an output device the feature on the second mesh model modeling in the deformed configuration.

16. The system of claim 15, wherein the software program is operable to define the model of the feature by using the plurality of points to define the perimeter of the feature.

17. The system of claim 15, wherein the software program is operable to model the response of the feature by modeling the change in the shape and the dimensions of the feature with respect to the deformed configuration of the material.

18. The system of claim 15, wherein the software is operable to model the response of the feature by automatically modeling the response of the feature upon defining the second mesh model.

19. The system of claim 15, wherein the software is operable to define a model of the feature by defining any curves of the feature with the plurality of points.

20. The system of claim 15, wherein the surface point of the first mesh model has a relative location value, and wherein the software program is operable to locate the same surface point by locating a surface point on the second mesh model that has the same relative location value as the surface point of the first mesh model.

* * * * *